(12) United States Patent
Orr et al.

(10) Patent No.: US 8,123,279 B2
(45) Date of Patent: Feb. 28, 2012

(54) NET STRUCTURES, VEHICLES INCLUDING NET STRUCTURES, AND METHODS

(75) Inventors: Bill E. Orr, Fountain Valley, CA (US); Kaita Kihoko, Tokyo (JP); Takahashi Kosaku, Asaka (JP); Inoue Masahiro, Niiza (JP); Kevin L. Aschenbach, Reseda, CA (US); Takashi Mishima, Torrance, CA (US); Terry L. Gasparovic, Torrance, CA (US); Hendrik J. Zwart, San Pedro, CA (US); Jeffrey K. Kuida, La Palma, CA (US)

(73) Assignee: Honda Motor Company, Ltd., Tokyo (JP)

( * ) Notice: Subject to any disclaimer, the term of this patent is extended or adjusted under 35 U.S.C. 154(b) by 308 days.

(21) Appl. No.: 12/414,728

(22) Filed: Mar. 31, 2009

(65) Prior Publication Data

US 2009/0243339 A1  Oct. 1, 2009

Related U.S. Application Data

(60) Provisional application No. 61/040,860, filed on Mar. 31, 2008.

(51) Int. Cl.
*B60J 5/06* (2006.01)
(52) U.S. Cl. .................... 296/148; 296/190.03
(58) Field of Classification Search ............ 49/381, 49/463, 465; 280/749, 756; 296/146.1, 147, 296/148, 190.03; 160/105, 327, 354, 368.1, 160/370.21, DIG. 2, DIG. 8
See application file for complete search history.

(56) References Cited

U.S. PATENT DOCUMENTS

| | | | | |
|---|---|---|---|---|
| 1,614,010 A | * | 1/1927 | Martinov | 296/145 |
| 1,657,506 A | * | 1/1928 | Jacobson | 160/37 |
| 1,684,027 A | * | 9/1928 | Hinman | 160/180 |
| 1,796,148 A | * | 3/1931 | Greenblatt | 160/102 |
| 2,596,114 A | | 5/1952 | Anderson | |
| 3,011,820 A | | 12/1961 | Frieder et al. | |
| 3,288,200 A | | 11/1966 | Gagne | |
| 3,338,290 A | * | 8/1967 | Servis | 160/238 |
| 3,550,956 A | | 12/1970 | Lowe | |
| 3,550,957 A | | 12/1970 | Radke et al. | |
| 3,749,147 A | | 7/1973 | Hess et al. | |
| 3,926,227 A | | 12/1975 | Takada et al. | |
| 4,031,942 A | | 6/1977 | Shelton | |
| 4,457,251 A | | 7/1984 | Weman et al. | |
| 4,958,853 A | | 9/1990 | Doty | |
| 4,986,389 A | * | 1/1991 | Halligan et al. | 182/138 |

(Continued)

OTHER PUBLICATIONS

Webpage printout depicting Rhino Foot Nets/Mesh [online]. [Retrieved on Mar. 20, 2008]. Retrieved from the Internet: <URL: www.simpsonraceproducts.com/products/offroad_nets_rhino.aspx>. 2 pages.

(Continued)

*Primary Examiner* — Dennis Pedder
*Assistant Examiner* — Paul Chenevert
(74) *Attorney, Agent, or Firm* — Ulmer & Berne LLP (57) ABSTRACT

A vehicle includes a roll cage and a net structure. The roll cage at least partially defines a protected area and additionally at least partially defines an access opening configured to facilitate passage of an operator through the access opening and into the protected area. A net structure is attached to the roll cage and is configured to selectively block at least a portion of the access opening. Net structures and methods are also provided.

16 Claims, 7 Drawing Sheets

U.S. PATENT DOCUMENTS

| | | | | |
|---|---|---|---|---|
| 5,026,231 | A | * | 6/1991 | Moore ............................ 410/118 |
| 5,121,958 | A | | 6/1992 | Goeden et al. |
| 5,123,468 | A | * | 6/1992 | Mater, Jr. ...................... 150/168 |
| 5,290,086 | A | | 3/1994 | Tucker |
| 5,375,879 | A | | 12/1994 | Williams et al. |
| 5,417,273 | A | | 5/1995 | Bamonte |
| 5,423,589 | A | | 6/1995 | Pank |
| 5,460,409 | A | * | 10/1995 | Conner ........................... 280/749 |
| 5,489,136 | A | | 2/1996 | Pank |
| 5,509,717 | A | * | 4/1996 | Martin ........................... 296/77.1 |
| 5,529,341 | A | | 6/1996 | Hartigan |
| 5,531,478 | A | * | 7/1996 | Houston et al. ................ 280/762 |
| 5,597,028 | A | | 1/1997 | Rolf et al. |
| 5,678,882 | A | * | 10/1997 | Hammond ................. 296/146.1 |
| 5,695,217 | A | | 12/1997 | Ament et al. |
| 5,713,624 | A | | 2/1998 | Tower |
| 5,879,048 | A | | 3/1999 | Tower |
| 6,183,028 | B1 | | 2/2001 | Ament et al. |
| 6,354,355 | B1 | | 3/2002 | Ragouzis |
| 6,367,536 | B1 | | 4/2002 | St Louis |
| 6,491,052 | B1 | * | 12/2002 | Zheng ............................ 135/125 |
| 6,502,859 | B1 | | 1/2003 | Svetlik |
| 6,505,880 | B1 | * | 1/2003 | Castro ............................ 296/102 |
| 6,626,462 | B2 | | 9/2003 | Saczalski et al. |
| 6,773,054 | B2 | | 8/2004 | Martini |
| 6,847,290 | B2 | | 1/2005 | Tardif |
| 6,869,125 | B2 | | 3/2005 | Hamm |
| 6,905,098 | B2 | | 6/2005 | Tisol, Jr. |
| 6,979,045 | B1 | | 12/2005 | Evans |
| 7,036,869 | B1 | | 5/2006 | Stipanovich |
| 7,097,204 | B2 | | 8/2006 | Jessup et al. |
| 7,125,069 | B2 | * | 10/2006 | Cacucci et al. .......... 296/190.03 |
| 7,147,263 | B2 | | 12/2006 | Schneidau et al. |
| 7,252,325 | B2 | | 8/2007 | Richards et al. |
| 7,422,256 | B2 | | 9/2008 | Mueller |
| 7,556,291 | B2 | * | 7/2009 | Gale et al. ..................... 280/749 |
| 2001/0023745 | A1 | * | 9/2001 | Haid et al. .................... 160/105 |
| 2001/0033084 | A1 | | 10/2001 | Murray et al. |
| 2002/0180197 | A1 | * | 12/2002 | Saczalski et al. ............. 280/749 |
| 2004/0232719 | A1 | | 11/2004 | Scarlett |
| 2007/0145775 | A1 | | 6/2007 | Smith |
| 2008/0251002 | A1 | | 10/2008 | Burleigh |
| 2009/0267335 | A1 | * | 10/2009 | Johnson et al. ............... 280/756 |

OTHER PUBLICATIONS

Webpage printout depicting mounting instructions for a Simpson-Foot Net [online]. [Retrieved on Mar. 20, 2008]. Retrieved from the Internet: <URL: www.simpsonraceproducts.com/prod_images/offroad/foot_net_diagram.jpg>. 1 page.

Webpage printout depicting Racing Window Safety Net Installation [online]. [Retrieved on Mar. 4, 2008]. Retrieved from the Internet: <URL: www.circletrack.com/safety/ctrp_0803_racing_window_net/photo_14.html>. 1 page.

U.S. Appl. No. 12/750,757, Titled: Net Structure for a Vehicle, filed Mar. 31, 2010, Inventors: Darin D. King et al., in its entirety.

U.S. Appl. No. 12/849,366, Titled: Net Structure for a Vehicle, filed Aug. 3, 2010, Inventor: Darin D. King, in its entirety.

* cited by examiner

NET STRUCTURES, VEHICLES INCLUDING NET STRUCTURES, AND METHODS

REFERENCE TO RELATED APPLICATION

The present application claims the priority benefit of U.S. provisional application Ser. No. 61/040,860 filed Mar. 31, 2008.

TECHNICAL FIELD

A net structure is configured for attachment to a roll cage of a vehicle for selectively blocking at least a portion of an access opening to an area protected by the roll cage.

BACKGROUND

Some conventional utility vehicles include a roll cage which assists in protecting properly seated and secured operators during a rollover situation or a situation involving a significant lateral incline of the vehicle. However, it remains possible for such an operator to become injured when operating such a conventional vehicle during such a situation.

SUMMARY

In accordance with one embodiment, a vehicle comprises a seat, a roll cage, and a net structure. The seat is configured to support an operator during operation of the vehicle. The roll cage at least partially defines a protected area adjacent to the seat. The roll cage additionally at least partially defines an access opening configured to facilitate passage of an operator through the access opening and into the protected area. The net structure comprises a mesh structure and a flexible reinforcement structure attached to the mesh structure. The reinforcement structure is attached to the roll cage. The net structure is configured to selectively block at least a portion of the access opening.

In accordance with another embodiment, a net structure comprises a mesh structure and a flexible reinforcement structure attached to the mesh structure. The reinforcement structure is configured for attachment to a roll cage of a vehicle. The net structure is configured, when attached to a roll cage of a vehicle, to selectively block at least a portion of an access opening to a protected area of a vehicle.

In accordance with yet another embodiment, a method is provided of protecting a vehicle operator. The method comprises attaching a flexible reinforcement structure of a net structure to a roll cage of a vehicle to facilitate selective blocking by the net structure of at least a portion of an access opening to a protected area of the vehicle. The net structure comprises a mesh structure attached to the reinforcement structure.

In accordance with still another embodiment, a method is provided of manufacturing a net structure. The method comprises attaching a flexible reinforcement structure to a mesh structure. The reinforcement structure is configured for attachment to a roll cage of a vehicle to facilitate selective blocking by the net structure of at least a portion of an access opening to a protected area of the vehicle.

In accordance with yet another embodiment, a vehicle comprises a seat, a roll cage, a net structure, and a latch assembly. The seat is configured to support an operator during operation of the vehicle. The roll cage at least partially defines a protected area adjacent to the seat. The roll cage additionally at least partially defines an access opening configured to facilitate passage of an operator through the access opening and into the protected area. The net structure is attached to the roll cage and is configured to selectively block at least a portion of the access opening. The latch assembly comprises first and second interlocking portions which are configured to selectively interlock with one another. The first interlocking portion is attached to the net structure. The second interlocking portion is attached to the roll cage.

In accordance with still another embodiment, a net structure is provided in combination with an interlocking portion of a latch assembly. The combination comprises a net structure and an interlocking portion. The net structure is configured for attachment to a roll cage of a vehicle. The interlocking portion of a latch assembly is attached to the net structure and is configured to selectively interlock with another interlocking portion attached to a roll cage of a vehicle. The net structure is configured, when attached to a roll cage of a vehicle, to selectively block at least a portion of an access opening to a protected area of a vehicle.

In accordance with still another embodiment, a method is provided for protecting a vehicle operator. The method comprises attaching a net structure to a roll cage of a vehicle to facilitate selective blocking by the net structure of at least a portion of an access opening to a protected area of the vehicle. A first interlocking portion of a latch assembly is attached to the net structure. The method further comprises attaching a second interlocking portion of the latch assembly to the roll cage. The first and second interlocking portions are configured to selectively interlock with one another.

In accordance with yet another embodiment, a method is provided of manufacturing a net structure. The method comprises attaching an interlocking portion of a latch assembly to a mesh structure. The interlocking portion is configured to selectively interlock with another interlocking portion attached to a roll cage of a vehicle. The net structure is configured, when attached to a roll cage of the vehicle, to selectively block at least a portion of an access opening to a protected area of the vehicle.

In accordance with still another embodiment, a vehicle comprises a seat, a roll cage, a net structure, and a latch assembly. The seat is configured to support an operator during operation of the vehicle. The roll cage at least partially defines a protected area adjacent to the seat. The roll cage additionally at least partially defines an access opening configured to facilitate passage of an operator through the access opening and into the protected area. The net structure is attached to the roll cage and is configured to selectively block at least a portion of the access opening. The latch assembly comprises first and second interlocking portions which are configured to selectively interlock with one another. The first interlocking portion is attached to the net structure. The second interlocking portion is attached to the roll cage. The net structure defines a hand opening adjacent to the first interlocking portion and is configured to facilitate passage of a portion of an operator's hand to facilitate grasping of the first interlocking portion.

In accordance with yet another embodiment, a net structure is provided in combination with an interlocking portion of a latch assembly. The combination comprises a net structure and an interlocking portion of a latch assembly. The net structure is configured for attachment to a roll cage of a vehicle. The interlocking portion is attached to the net structure and is configured to selectively interlock with another interlocking portion attached to a roll cage of a vehicle. The net structure defines a hand opening adjacent to the interlocking portion. The hand opening is configured to facilitate passage of a portion of an operator's hand to facilitate grasping of the interlocking portion. The net structure is configured, when attached to a roll cage of a vehicle, to selectively block at least a portion of an access opening to a protected area of a vehicle.

In accordance with yet another embodiment, a method is provided for protecting a vehicle operator. The method comprises attaching a net structure to a roll cage of a vehicle to facilitate selective blocking by the net structure of at least a portion of an access opening to a protected area of the vehicle. A first interlocking portion of a latch assembly is attached to the net structure adjacent to a hand opening defined in the net structure. The hand opening is configured to facilitate passage of a portion of an operator's hand to facilitate grasping of the first interlocking portion. The method further comprises attaching a second interlocking portion of the latch assembly to the roll cage. The first and second interlocking portions are configured to selectively interlock with one another.

In accordance with still another embodiment, a method is provided of manufacturing a net structure. The method comprises attaching an interlocking portion of a latch assembly to a mesh structure adjacent to a hand opening of the net structure. The interlocking portion is configured to selectively interlock with another interlocking portion of the latch assembly attached to the roll cage of the vehicle. The hand opening is configured to receive a portion of an operator's hand inserted at least partially through the hand opening and grasping the interlocking portion. The net structure is configured, when attached to a roll cage of the vehicle, to selectively block at least a portion of an access opening to a protected area of the vehicle.

In accordance with yet another embodiment, a vehicle comprises a seat, a roll cage, and a net structure. The seat is configured to support an operator during operation of the vehicle. The roll cage at least partially defines a protected area adjacent to the seat. The roll cage additionally at least partially defines an access opening configured to facilitate passage of an operator through the access opening and into the protected area. The net structure is attached to the roll cage and is configured to selectively block at least a portion of the access opening adjacent to an operator's arm during operation of the vehicle. The net structure comprises a plurality of strap assemblies wrapped at least partially about respective portions of the roll cage.

In accordance with still another embodiment, a net structure comprises a mesh structure and a plurality of strap assemblies attached to the mesh structure and configured to wrap at least partially about respective portions of a roll cage of a vehicle. The net structure is configured, when attached to a roll cage of a vehicle, to selectively block at least a portion of an access opening to a protected area of a vehicle.

In accordance with still another embodiment, a method is provided for protecting a vehicle operator. The method comprises attaching a plurality of strap assemblies of a net structure to a roll cage of a vehicle to facilitate selective blocking by the net structure of at least a portion of an access opening to a protected area of the vehicle. The portion of the access opening is adjacent to an operator's arm during operation of the vehicle.

In accordance with yet another embodiment, a method is provided of manufacturing a net structure. The net structure is configured for attachment to a roll cage of a vehicle for protecting an operator. The method comprises attaching a plurality of strap assemblies to a mesh structure. Each of the strap assemblies is configured to wrap at least partially about respective portions of the roll cage of the vehicle.

In accordance with yet another embodiment, a vehicle comprises a seat, a roll cage, and a net structure. The seat is configured to support an operator during operation of the vehicle. The roll cage at least partially defines a protected area adjacent to the seat. The roll cage additionally at least partially defines an access opening configured to facilitate passage of an operator through the access opening and into the protected area. The net structure is attached to the roll cage and is configured to selectively block at least a portion of the access opening. The net structure comprises a fastener arrangement having first and second mating portions configured to selectively engage one another.

In accordance with still another embodiment, a net structure is configured for attachment to a roll cage of a vehicle. The net structure comprises a mesh structure and a fastener arrangement. The fastener arrangement has first and second mating portions attached to the mesh structure and which are configured to selectively engage one another. The net structure is configured, when attached to a roll cage of a vehicle, to selectively block at least a portion of an access opening to a protected area of a vehicle. When the first and second mating portions are engaged with one another, at least a portion of the access opening remains unblocked by the net structure to facilitate passage of an operator through the access opening and into the protected area.

In accordance with yet another embodiment, a method is provided for protecting a vehicle operator. The method comprises attaching a net structure to a roll cage of a vehicle to facilitate selective blocking by the net structure of at least a portion of an access opening to a protected area of the vehicle. The net structure comprises a fastener arrangement having first and second mating portions configured to selectively engage one another.

In accordance with still another embodiment, a method is provided of manufacturing a net structure. The net structure is configured for attachment to a roll cage of a vehicle for protecting an operator. The method comprises attaching first and second mating portions to a mesh structure. The first and second mating portions are configured to selectively engage one another.

BRIEF DESCRIPTION OF THE DRAWINGS

It is believed that certain embodiments will be better understood from the following description taken in conjunction with the accompanying drawings in which.

DETAILED DESCRIPTION

Figure 1:
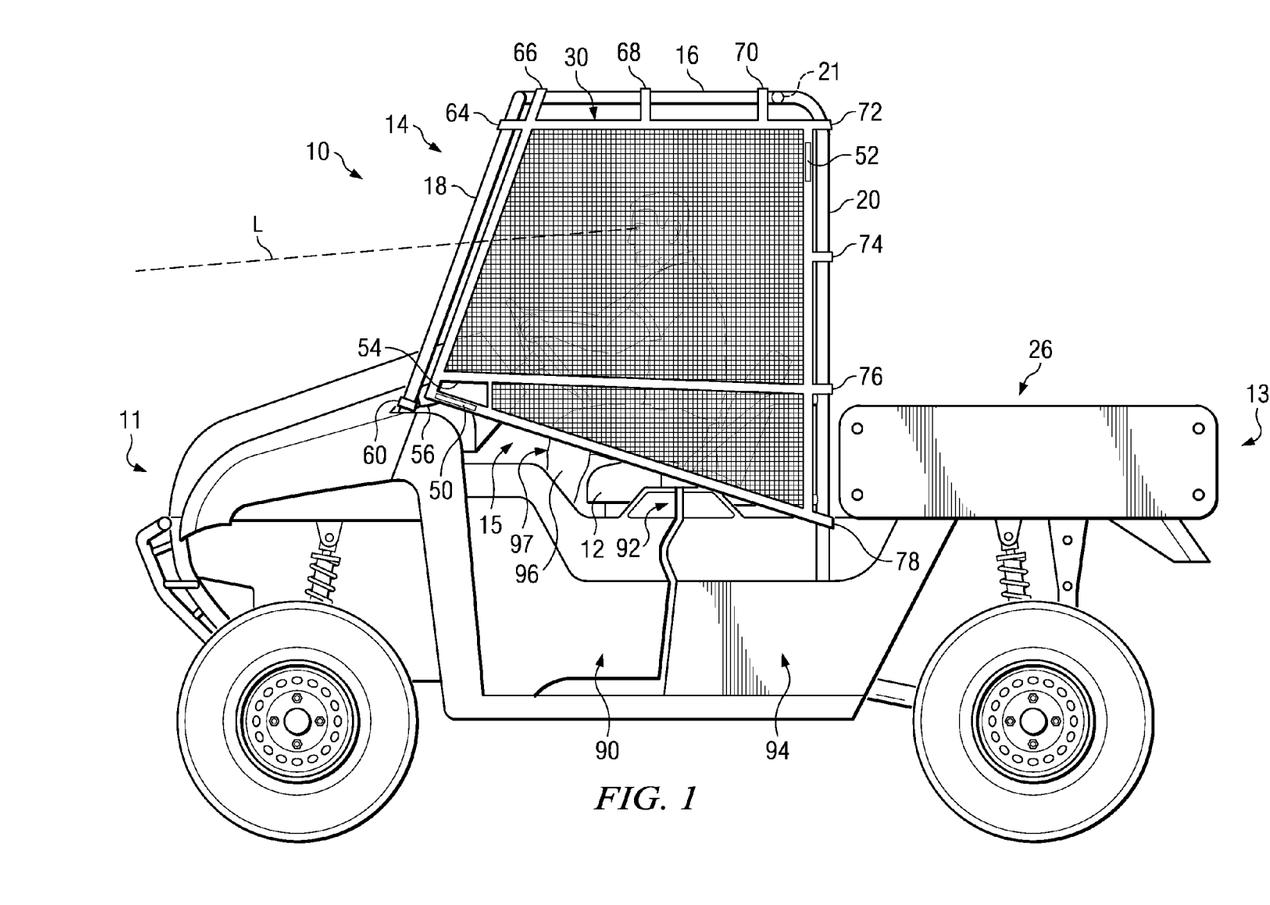
FIG. 1 is a left side elevational view depicting a vehicle having a net structure in accordance with one embodiment, wherein the net structure is in a closed position.

Embodiments are hereinafter described in detail in connection with the views and examples of FIGS. 1-8, wherein like numbers indicate the same or corresponding elements throughout the views. With reference to FIG. 1, a vehicle 10 is shown to extend from a front end 11 to a rear end 13 and to include a seat 12 for supporting an operator (e.g., 97 shown in FIG. 1) during operation of the vehicle 10. It will be appreciated that the operator can be a driver and/or a passenger of the vehicle 10. In the example of FIG. 1, the operator 97 is shown to be a driver of the vehicle 10 who is sitting upon the seat 12, and who is holding a steering wheel 24 of the vehicle 10 with a hand (identified as 99 in FIG. 4) of his outstretched arm (identified as 98 in FIG. 4). By turning of the steering wheel 24, it will appreciated that the operator 97 can effect steering of the vehicle 10. It will furthermore be appreciated that the seat 12 can comprise a bucket-type seat or a bench-type seat, for example.

Figure 6:
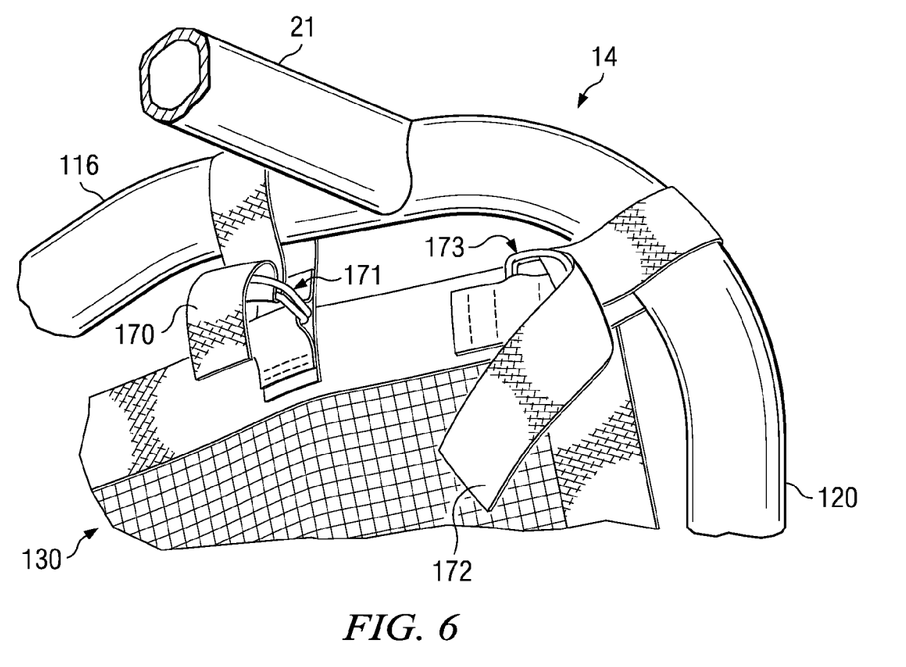
FIG. 6 is a fragmentary left perspective view depicting another portion of the vehicle of FIG. 1.
Figure 7:
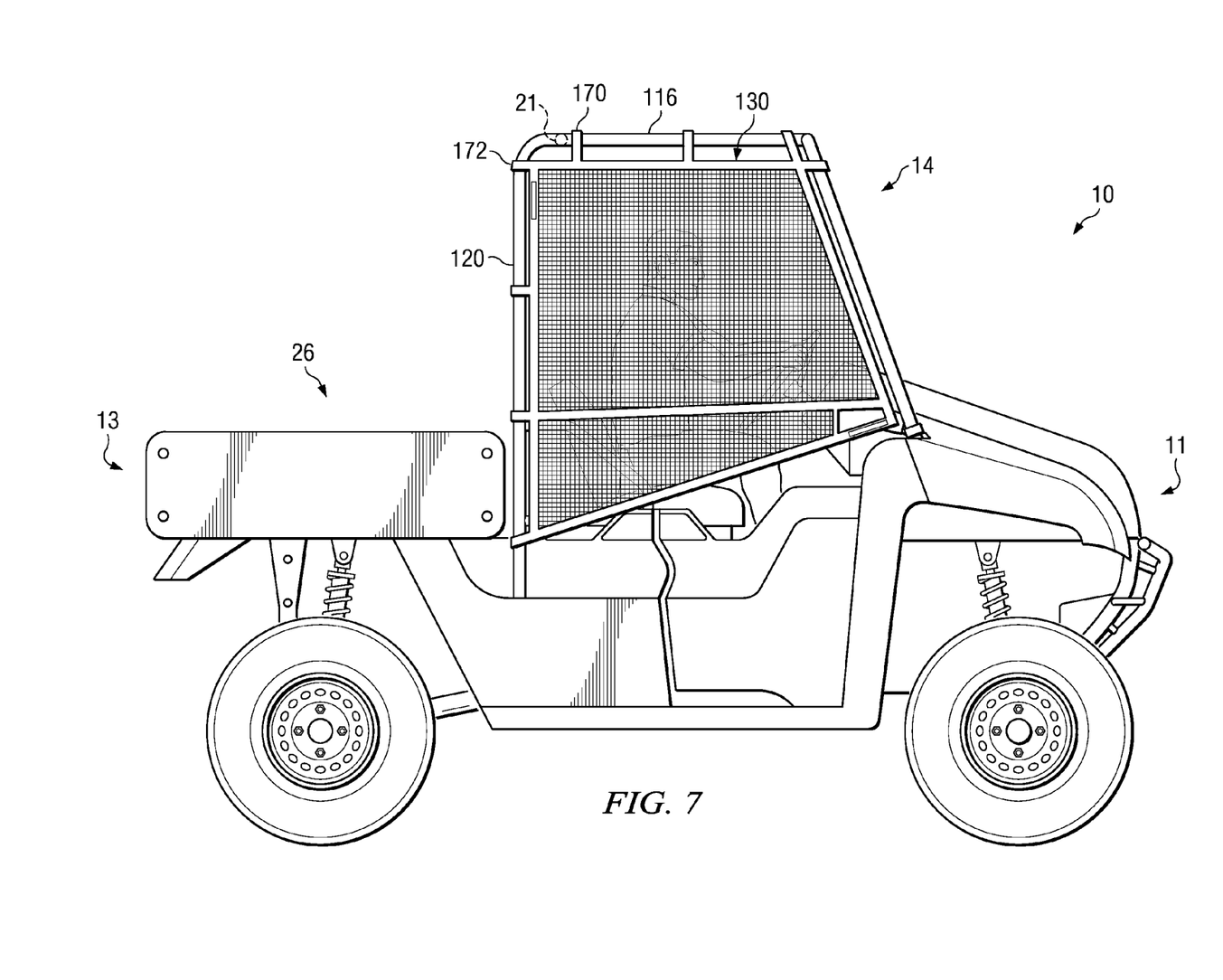
FIG. 7 is a right side elevational view depicting the vehicle of FIG. 1.

When sitting upon the seat 12 as shown in FIG. 1, the operator can reside within a protected area 15 which is at least partially defined by a roll cage 14 of the vehicle 10. The roll cage 14 is shown in FIG. 1 to comprise an upper tubular member 16, a forward tubular member 18, and a rearward tubular member 20. The roll cage 14 can additionally include a similar arrangement of tubular members (e.g., upper tubular member 116 and rearward tubular member 120, both of which are shown in FIGS. 6-7) on an opposite side of the vehicle 10, and one or more cross-members (e.g., cross tubular member 21 in FIGS. 1, 4, 6, and 7) extending between tubular members correspondingly disposed upon opposite sides of the vehicle 10 (e.g., the upper tubular members 16 and 116). Though the tubular members can have a hollow interior and a generally cylindrical exterior (e.g., see cross tubular member 21 in FIG. 6), it will be appreciated that one or more of the tubular members of a roll cage can be formed with a solid interior and/or can have an exterior having any of a variety of alternative shapes and/or configurations.

The vehicle 10 is shown in FIG. 1 to comprise a utility-type vehicle having a utility bed 26 provided adjacent to the roll cage 14. The utility bed 26 can be configured to support cargo and/or passengers for transportation by the vehicle 10. In one embodiment, as shown in FIG. 1, it will be appreciated that the utility bed 26 might not be provided within the protected area 15. As such, it will be appreciated that cargo and/or persons supported by the utility bed might not be provided within the protected area 15. In other embodiments, however, a utility bed and/or cargo and/or persons supported by a utility bed might reside within a protected area at least partially defined by a roll cage of a vehicle. In one embodiment, the utility bed 26 can be fixed with respect to the roll cage 14 while, in another embodiment, the utility bed 26 can be selectively pivotable as a dump-type bed. In still another embodiment, a vehicle might not include a utility bed.

Figure 4:
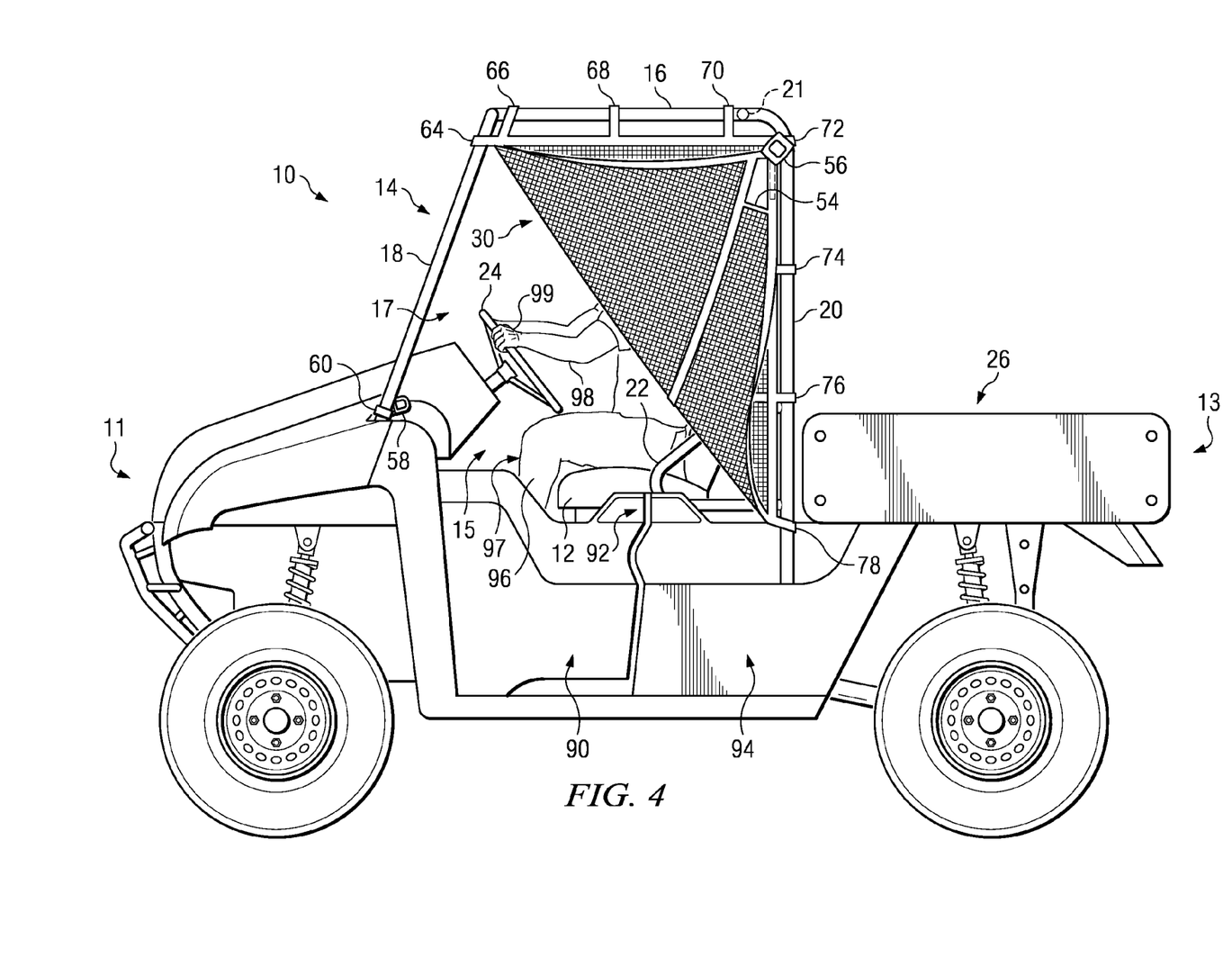
FIG. 4 is a left side elevational view depicting the vehicle of FIG. 1, wherein the net structure is in an opened position.

A roll cage can at least partially define an access opening. For example, with reference to FIG. 1, the upper tubular member 16, forward tubular member 18, and rearward tubular member 20 can cooperate to at least partially define an access opening 17 (see FIG. 4). The operator 10 can pass through the access opening 17 when boarding the vehicle 10, and can pass from the protected area 15 and through the access opening 17 when exiting the vehicle 10. Any of a variety of other features of a vehicle can cooperate with the roll cage in defining such an access opening to a protected area. For example, in the particular example of FIGS. 1 and 4, the roll cage 14 is shown to cooperate with a door 90 and a stationary body portion 94 in defining the access opening 17. In one embodiment, a forward end of the door 90 can be hingedly attached to the remainder of the vehicle 10 such that the door 90 can swing between opened and closed positions. A door latch assembly can be provided (e.g., in the vicinity marked 92) for selective use by an operator to selectively lock a rearward or swinging end of the door 90 to the stationary body portion 94, thereby locking the door 90 in a closed position as shown in FIG. 1. It will be appreciated that an access opening can additionally or alternatively be at least partially defined by one or more other features of a vehicle. It will also be appreciated that, while FIGS. 1 and 4 depict the access opening 17 provided upon a left side of the vehicle 10, such as to facilitate passage of a driver (e.g., operator 97) of the vehicle, a corresponding access opening might be provided upon the right side of the vehicle 10, such as to facilitate passage of a passenger of the vehicle (see FIG. 7).

The protected area 15 can be adjacent to the seat 12, and can be sized and configured to substantially or entirely surround one or more operators (e.g., a driver and a passenger) of the vehicle 10 during operation of the vehicle 10, as shown in FIG. 1. So long as the operator 97 stays within the protected area 15, it is unlikely that the operator 97 will sustain injuries from direct contact of the operator with road terrain during a rollover of the vehicle 10. A seat belt harness (not shown) might be associated with the seat 12, and one or more armrest members (e.g., 22) can be provided, for selectively restraining an operator's torso within the vehicle 10 during a rollover.

With further reference to FIGS. 1-7, the vehicle 10 can comprise net structures 30 and 130 respectively disposed upon left and right sides of the vehicle 10. For example, the net structure 30 can be configured, when attached to the roll cage 14 of the vehicle 10, as shown in FIG. 1, to selectively block at least a portion of the access opening 17 to the protected area 15. As shown in FIG. 1, the portion of the access opening 17 which is selectively blocked by the net structure 30 can be adjacent to the operator's left arm (identified as 98 in FIG. 4) and hand (identified as 99 in FIG. 4) during operation of the vehicle 10. It will be appreciated that the net structure 130 (see FIGS. 6 and 7) can similarly be provided upon an opposite side of the vehicle 10 at a location adjacent to an operator's (e.g., a passenger's) right arm and hand, and that features of the net structure 130 can correspond with those of the net structure 30 and therefore will not be described in detail herein. In an alternative embodiment, however, it will be appreciated that a vehicle might have a right-side net structure which is substantially different than its left-side net structure, and/or might not include a right-side or left-side net structure. It will also be appreciated that a net structure can be provided in any of a variety of other locations and/or configurations for selectively blocking at least a portion of an access opening to a protected area on a vehicle.

When both the net structure 30 and the door 90 are in closed positions, as shown in FIG. 1, the net structure 30 can cooperate with the door 90 to substantially block the access opening 17, and thus prevent the arms and/or legs of an operator, during operation of the vehicle 10, from leaving the protected area 15. For example, when both the net structure 30 and the door 90 are in closed positions as shown in FIG. 1, the net structure 30 can prevent an operator's arms (e.g., 98 in FIG. 4) from leaving the protected area 15 during operation of the vehicle 10, and the door 90 can prevent an operator's legs (e.g., 96 in FIGS. 1 and 4) from leaving the protected area 15 during operation of the vehicle 10. It will be appreciated that, in other embodiments, a net structure might be used in any of a variety of other arrangements, with or without one or more associated doors, for substantially blocking an access opening to a protected area of a vehicle.

In one embodiment, the net structure 30 can be attached to the roll cage 14 as shown, for example, in FIG. 1, and as described in further detail below. In one embodiment, such as in the embodiment of FIG. 1, the net structure 30 can be attached to the roll cage 14 such that the net structure 30 is readily removable such as to facilitate cleaning, replacement, and/or repair of the net structure 30. The net structure 30 is shown in FIG. 1 to extend vertically from a position adjacent to an uppermost portion of the roll cage 14 to a position adjacent to a lowermost portion of the seat 12. However, it will be appreciated that a net structure might be attached to a roll cage and/or other components of a vehicle in any of a variety of other configurations and/or arrangements.

A net structure can be provided in any of a variety of configurations. In one embodiment, such as depicted in FIGS. 1-5, the net structure 30 can comprise a mesh structure 32. The mesh structure 32 can be flexible in nature such that the mesh structure 32 can be easily folded or bent, for example. The mesh structure 32 can be formed from rope netting, web netting, fabric netting, screen, and/or any of a variety of other materials. In one embodiment, such as depicted in the embodiment of FIGS. 1-5, the mesh structure 32 can define a uniform arrangement of similarly-sized openings. In one embodiment, these openings might each be small enough to prevent passage of an operator's hand through the opening. In another embodiment, these openings might each be small enough to prevent passage of an operator's finger through the opening. It will be appreciated that the mesh structure 32, when so configured, can nevertheless facilitate visibility by an operator through the mesh structure 32.

In one embodiment, such as depicted in FIGS. 1-5, the net structure 30 can additionally comprise a reinforcement structure 34. The reinforcement structure 34 can be flexible in nature such that it can be easily folded or bent, for example. However, the reinforcement structure 34, though flexible, might be substantially resistant to stretching. For example, the reinforcement structure 34 can be formed from webbing, fabric, belting, wire, cable, and/or some other material, for example. In one embodiment, such as that shown in FIGS. 1-5, the reinforcement structure 34 might not facilitate visibility of an operator through the reinforcement structure 34 itself (e.g., such as when formed from nylon webbing), although in another embodiment, a reinforcement structure might be transparent (e.g., such as if formed from translucent PET material). The reinforcement structure 34 can be attached to the net structure 30 in any of a variety of suitable configurations to help ensure maintenance of the net structure in a particular shape and/or configuration. In one such configuration, the reinforcement structure 34 can include a perimeter strip 36 and at least one bisecting strip 40.

Figure 2:
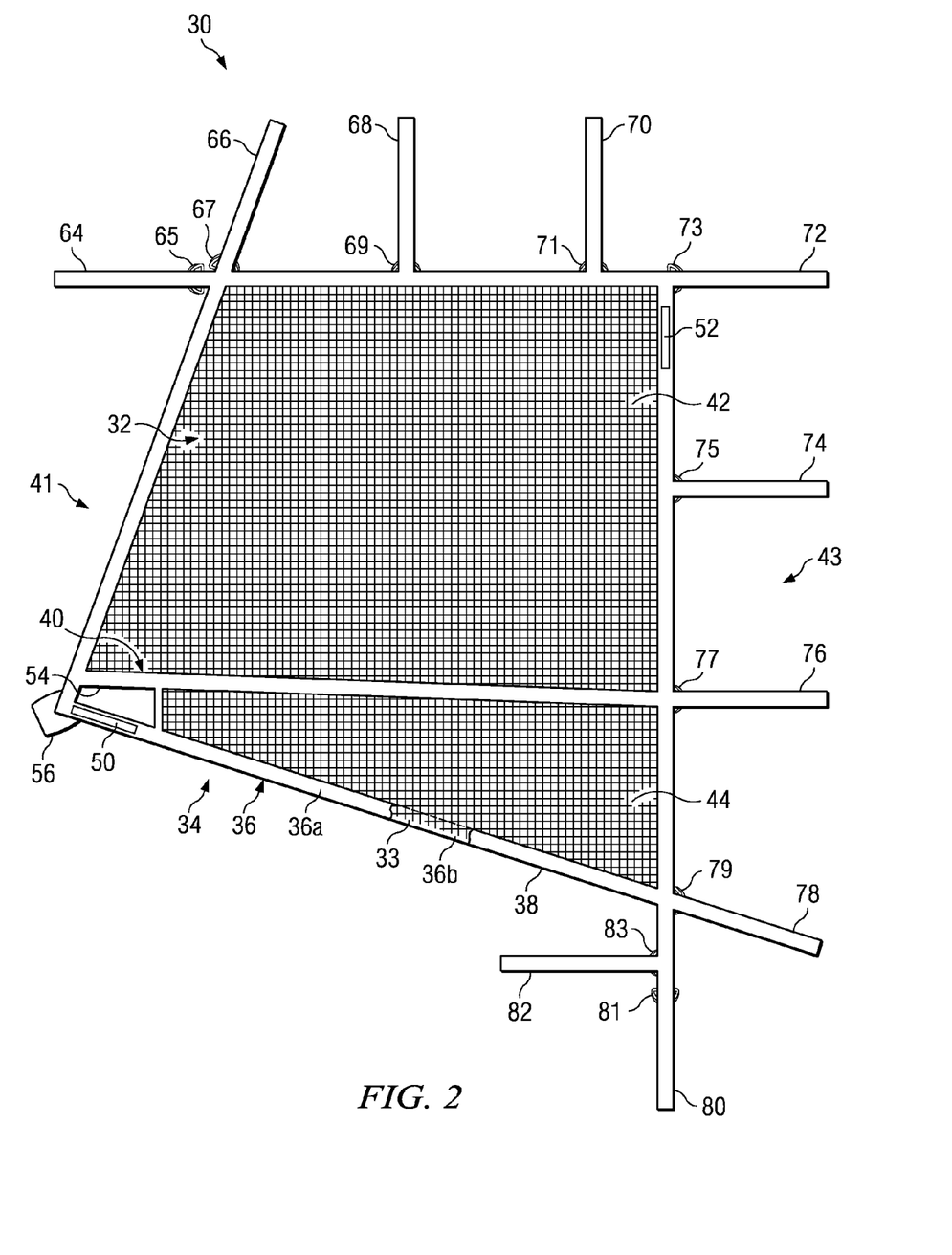
FIG. 2 is an enlarged left side elevational view depicting the net structure and the associated first interlocking portion of FIG. 1 apart from the remaining components of the vehicle of FIG. 1, wherein part of the perimeter strip is shown to be broken out for clarity of illustration.
Figure 3:
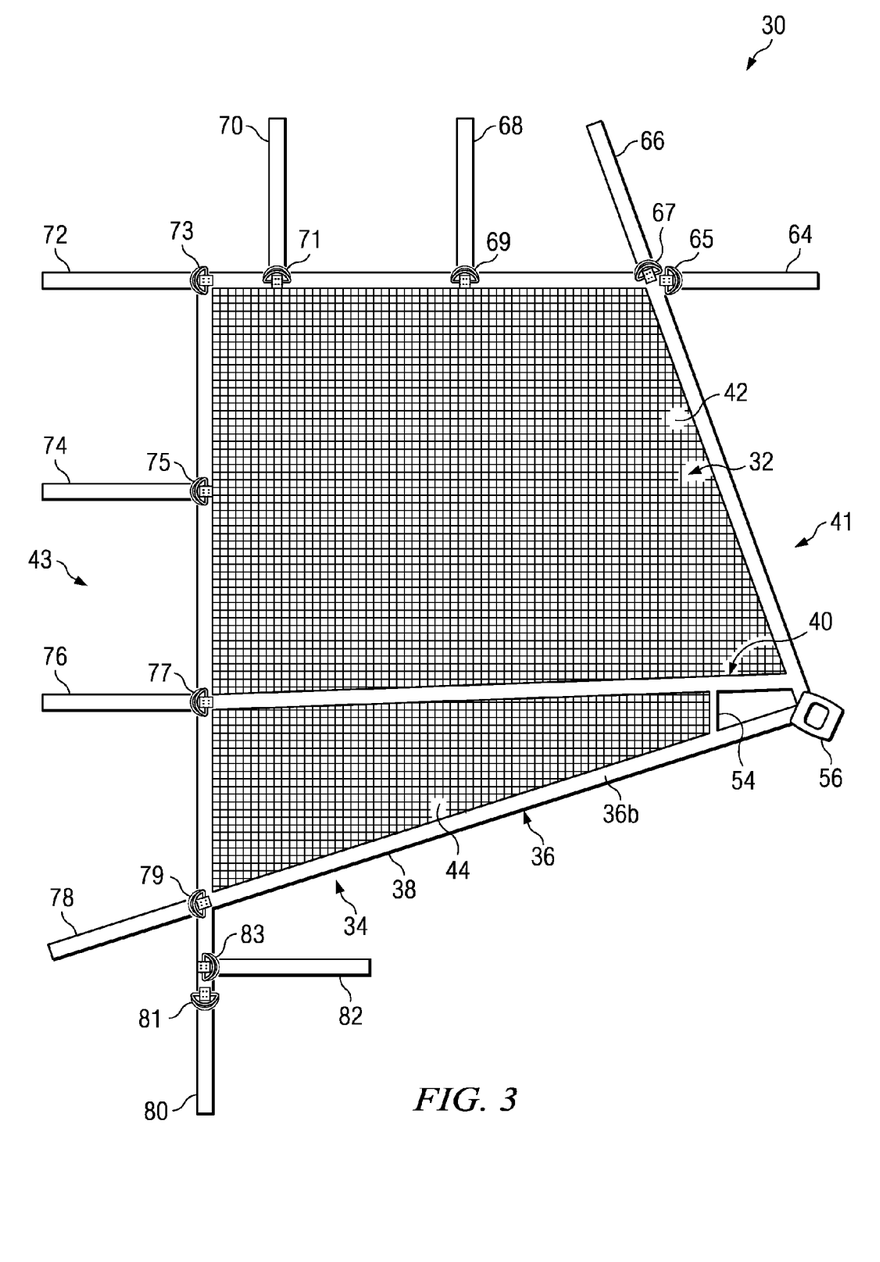
FIG. 3 is an enlarged right side elevational view depicting the components of FIG. 2.

The perimeter strip 36 is shown in FIGS. 2-3 to comprise two pieces of webbing 36a, 36b (e.g., formed from nylon) which are disposed upon opposite sides of a perimeter 33 of the mesh structure 32 and are attached (e.g., via adhesive and/or sewing) to sandwich the perimeter 33 and thus define an outer perimeter 38 for the net structure 30. However, it will be appreciated that a perimeter strip can be provided and/or attached to a mesh structure in any of a variety of suitable alternative configurations. The perimeter strip 36 can cooperate with the mesh structure 32 and/or any bisecting strips (e.g., 40, described below) to ensure that the outer perimeter 38 of the net structure remains substantially uniform in size and position with respect to the roll cage 14. In one embodiment, such as shown in FIGS. 1-4, the perimeter strip 36 can be attached to the mesh structure 32 about the entire perimeter 33 of the mesh structure 32. In other embodiments, however, only part of a perimeter of a mesh structure might be attached to a perimeter strip or other portion of a reinforcement structure. In still other embodiments, it will be appreciated that a net structure might not include any reinforcement portion whatsoever.

A bisecting strip (e.g., 40) can be formed similarly to the perimeter strip 36 described above, whereby two pieces of webbing (e.g., formed from nylon) can be disposed upon opposite sides of the mesh structure 32 and can be attached (e.g., via adhesive and/or sewing) to sandwich between them a portion of the mesh structure 32. However, it will be appreciated that a bisecting strip can be provided and/or attached to a mesh structure in any of a variety of suitable alternative configurations. The bisecting strip 40 is shown in FIGS. 1-4 to attach to the mesh structure 32 and to connect at opposite ends with spaced portions of the perimeter strip 36. The bisecting strip 40 can cooperate with the mesh structure 32 and/or the perimeter strip (e.g., 36) to help ensure that the length of the net structure across the access opening 17 (e.g., from adjacent to a strap 76 to adjacent to a buckle 56, both described below) remains substantially constant, and also to ensure that the outer perimeter 38 of the net structure remains substantially uniform in size and position with respect to the roll cage 14.

In one embodiment, as shown in FIGS. 1-4, the bisecting strip 40 can extend generally longitudinally in a direction from a front end 11 of the vehicle 10 to a rear end 13 of the vehicle 10, and/or from a front end 41 of the net structure 30 to a rear end 43 of the net structure 30. With reference to FIGS. 1-3, the bisecting strip 40 can be located generally adjacent to an arm (identified as 98 in FIG. 4) of an operator during operation of the vehicle 10. By positioning the bisecting strip 40 at this location, it will be appreciated that the net structure 30, when in a closed position as shown in FIG. 1, can effectively resist stretching or flexing of the net structure 30 resulting from contact by the operator's arm (identified as 98 in FIG. 4) with the net structure 30. Also, with the bisecting strip 40 in this location, the bisecting strip 40 bisects the mesh structure 32 into an upper portion 42 and a lower portion 44, and is located generally beneath an operator's line of sight ("L" in FIG. 1) of terrain during operation of the vehicle 10. The lower portion 44 of the mesh structure 32 is thus shown to be defined to have a substantially triangular shape by cooperation of the bisecting strip 40 and a portion of the perimeter strip 36. In other embodiments, it will be appreciated that a net structure might include an alternatively configured bisecting strip, one or more additional bisecting strips, and/or no bisecting strips whatsoever.

Referring again to the embodiment of FIGS. 1-7, the net structure 30 can be attached to the remainder of the vehicle 10 in any of a variety of suitable configurations. In one such configuration, the net structure 30 can be attached to the roll cage 14 with strap assemblies provided on the net structure 30. Each of the strap assemblies can be wrapped at least partially about respective portions of the roll cage 14 as described in further detail below. In one embodiment, the strap assemblies can be attached to, or provided by, the mesh structure of a net structure. However, in another embodiment, such as shown in FIGS. 1-7, the strap assemblies can be attached to the perimeter strip 36 of the reinforcement structure 34 of the net structure 30. Each of the strap assemblies can comprise a strap and two D-rings. A strap assembly attached to the perimeter strip can have its associated strap provided as a separate piece which is attached (e.g., through sewing and/or adhesives) to the perimeter strip, or can have its associated strap provided as a unitary member with the perimeter strip.

In the embodiment of FIGS. 1-4, the net structure is shown to include ten respective strap assemblies which each comprises a respective strap 64, 66, 68, 70, 72, 74, 76, 78, 80, 82 and a respective D-ring pair 65, 67, 69, 71, 73, 75, 77, 79, 81, 83 configured to selectively receive the respective strap 64, 66, 68, 70, 72, 74, 76, 78, 80, 82. Each D-ring pair 65, 67, 69, 71, 73, 75, 77, 79, 81, 83 comprises two D-rings. In one embodiment, at least one of the strap assemblies wraps at least partially about the forward tubular member 18 of the roll cage 14, multiple strap assemblies wrap at least partially about the upper tubular member 16 of the roll cage 14, and multiple strap assemblies wrap at least partially about the rearward tubular member 20 of the roll cage 14. For example, as shown in FIG. 1, the strap 64 wraps at least partially about the forward tubular member 18 of the roll cage 14 and is secured by the D-ring pair 65 (shown in FIGS. 2-3), the straps 66, 68, and 70 each wrap at least partially about the upper tubular member 16 of the roll cage 14 and are secured by the respective D-ring pairs 67, 69, and 71 (shown in FIGS. 2-3), and the straps 72, 74, 76, and 78 each wrap at least partially about the rearward tubular member 20 of the roll cage 14 are secured by the respective D-ring pairs 73, 75, 77, and 79 (shown in FIGS. 2-3). The remaining straps 80, 82 can wrap at least partially about other members of the roll cage 14, the armrest member 22, or other feature(s) of the vehicle 10.

The manner in which the respective straps 64, 66, 68, 70, 72, 74, 76, 78, 80, 82 wrap at least partially about respective portions of the roll cage 14 and are secured by the respective D-ring pairs 65, 67, 69, 71, 73, 75, 77, 79, 81, 83 can be similar to the manner in which the respective straps 170, 172 of the net structure 130 are shown in FIGS. 6-7 to wrap at least partially about respective portions of the roll cage 14 and to be secured to the respective D-ring pairs 171, 173. It will be appreciated that any of a variety of other quantity or positioning of strap assemblies (e.g., involving D-rings) can be provided to facilitate attachment of a net structure to a roll cage, and that any of a variety of other types of strap assemblies (e.g., not involving D-rings) might be provided to facilitate attachment of a net structure to a roll cage. It will be also be appreciated that strap assemblies involving straps and D-ring pairs, as discussed above, can facilitate simple and quick attachment, detachment, and adjustment of the net structures 30, 130 with respect to the roll cage 14, and without requiring any structural changes to the roll cage 14 to facilitate use of the net structures 30, 130.

The vehicle 10 can also include a latch assembly for use by an operator in selectively locking the net structure 30 in a closed position (as shown in FIG. 1). The latch assembly can include first and second interlocking portions which are configured to selectively interlock with one another. The first interlocking portion can be attached to the net structure. In one embodiment, as shown in the embodiment of FIGS. 1-5, the first interlocking portion can comprise a buckle 56 of a buckle/blade pair. The buckle 56 is shown to be attached to the perimeter strip 36 at a location adjacent to the bisecting strip 40 and further adjacent to a hand opening 54 defined in the net structure 30, although it will be appreciated that a blade of a buckle/blade pair can alternatively be attached to the perimeter strip of the net structure at this location. It will also be appreciated that a blade or handle of a buckle/blade pair can be attached to a different portion of a net structure, and/or in any of a variety of other locations upon the net structure. It will additionally be appreciated that a latch assembly can comprise a mechanically interlocking arrangement other than a buckle/blade pair, and that an interlocking portion of such an arrangement can be attached to a net structure in any of a variety of suitable configurations or arrangements.

The second interlocking portion can be attached to the roll cage and/or another part of the vehicle. For example, in the embodiment depicted in FIGS. 1-5, the second interlocking portion can comprise a blade 58 (shown in FIGS. 4-5) of a buckle/blade pair. It will be appreciated that the second interlocking portion can alternatively include a buckle of a buckle/blade pair. The second interlocking portion is additionally shown to include a mounting collar 60 which can be wrapped about at least a portion of the forward tubular member 18 of the roll cage 14, and which can support the blade 58 in a fixed position relative to the roll cage 14. In one embodiment, the mounting collar 60 can be configured to be removably attached to the roll cage 14 and/or another portion of the vehicle. For example, the mounting collar 60 can comprise an annular member which is split into halves that can be selectively attached together (e.g., with one or more bolts such as bolt 62 depicted in FIG. 5) to surround and be secured to a portion of a tubular member (e.g., forward tubular member 18). In this manner, attachment of the second interlocking portion to the roll cage can be achieved easily and quickly, and without requiring any modification to the roll cage itself. It will additionally be appreciated that a latch assembly can comprise a mechanically interlocking arrangement other than a buckle/blade pair, and that an interlocking portion of such an arrangement can be attached to a roll cage 14 or other portion of a vehicle in any of a variety of suitable configurations or arrangements. It will also be appreciated that a similar second interlocking arrangement can be provided upon a right side of a vehicle for interlocking with a locking portion attached to a net structure (e.g., 130) disposed upon the right side of the vehicle.

As previously indicated, the net structure 30 can define the hand opening 54 adjacent to the buckle 56, as shown in FIGS. 1-5. In one embodiment, as shown in FIGS. 1-5, the hand opening 54 can be entirely defined by the net structure 30 (as opposed to being defined through cooperation of the net structure 30 and the roll cage 14). In another embodiment, the hand opening 54 can be defined entirely by respective portions of the reinforcement structure 34 of the net structure 30, as also shown in FIGS. 1-5. In particular, the hand opening 54 can be defined entirely by cooperation of the perimeter strip 36 and the bisecting strip 40, as also shown in FIGS. 1-5. It will be appreciated that the reinforcement structure 34 can provide strength and resistance to stretching and variation of the shape of the net structure 30 near the hand opening 54. In an alternative embodiment, a mesh structure of a net structure might define part or all of a hand opening.

Figure 5:
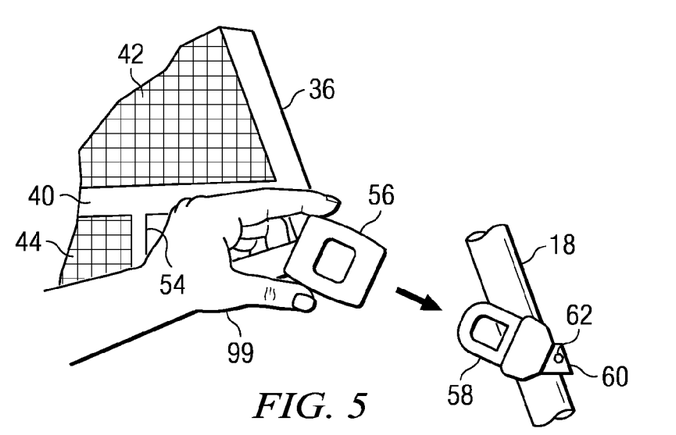
FIG. 5 is a fragmentary right elevational view depicting a portion of the vehicle of FIG. 1, wherein an operator is grasping a first interlocking portion of a latch assembly and urging the first interlocking portion toward a second interlocking portion of the latch assembly.

In one embodiment, the hand opening 54 can be configured to receive and facilitate passage of a portion of an operator's hand (e.g., 99) to facilitate grasping of the buckle 56 by the operator's hand as shown, for example, in FIG. 5. When the net structure 30 is in an opened position (e.g., shown in FIGS. 4-5), and the operator's hand grasps the buckle 56, as shown in FIG. 5, the operator can urge the buckle 56 onto the blade 58, thereby locking the net structure 30 in a closed position (shown in FIG. 1). When the net structure 30 is in a closed position (shown in FIG. 1), and the operator's hand grasps the buckle 56, the operator can effect removal of the buckle 56 from the blade 58 (e.g., by pressing an unlock button provided upon the buckle 56), thereby unlocking the net structure 30 from the closed position (shown in FIG. 1) and resulting in the net structure 30 being in an opened position (e.g., shown in FIGS. 4-5). In this manner, the hand opening 54 according facilitates simple, efficient, and effective grasping of the buckle 56, operation of the latch assembly, and opening/closing of the net structure 30. When the net structure 30 is locked in a closed position by the latch assembly, as shown in FIG. 1, it will be appreciated that the latch assembly can cooperate with the strap assemblies to facilitate attachment of the net structure 30 to the roll cage 14. Although the latch assembly is described above to include a single buckle/blade pair, it will be appreciated that a latch assembly for an alternative net structure might alternatively comprise multiple buckle/blade pairs, and/or any of a variety of other types of suitable interlocking mechanical arrangements which can facilitate selective locking of a net structure in a closed position.

In one embodiment, the net structure 30 can comprise a fastener arrangement having first and second mating portions 50, 52. The first and second mating portions 50, 52 can be attached to the mesh structure 32 of the net structure 30. In one embodiment, such as shown in FIG. 1, this attachment to the mesh structure 32 can involve attachment of the first and second mating portions 50, 52 to the reinforcement structure 34 which, in turn, is attached to the mesh structure 32. For example, in the embodiment of FIG. 1, a first mating portion 50 is shown to be attached to the perimeter structure 36 adjacent to the hand opening 54 and the buckle 56. The second mating portion 52 is shown to be attached to the perimeter structure 36 adjacent to the rearward tubular member 20 of the roll cage 14, and at a location adjacent to the upper tubular member 16 of the roll cage 14. However, it will be appreciated that first and second mating portions can be provided in any of a variety of other suitable locations and configurations. It will also be appreciated that a net structure might include more than two mating portions.

The fastener arrangement can comprise a hook and loop fastener arrangement such that the first mating portion 50 comprises hooks and the second mating portion 52 comprises loops, or such that the first mating portion 50 comprises loops and the second mating portion 52 comprises hooks. In another embodiment, the first and second mating portions 50, 52 can alternatively or additionally comprise snaps, buttons, zippers, and/or any of a variety of other mechanical features which can selectively engage one another. Though the first and second mating portions 50, 52 are shown in FIGS. 1-4 as having a substantially rectangular shape, it will be appreciated that mating portions can have any of a variety of other shapes. For example, in the embodiment of FIG. 8, it can be seen that first and second mating structures 250, 252, which can comprise respective portions of a hook and loop fastener arrangement, can each be generally provided in an L-shape.

When the first and second mating portions 50, 52 are disengaged, the net structure 30 can be locked in a closed position, as shown in FIG. 1, such as during operation of the vehicle 10. However, when the first and second mating portions 50, 52 are engaged with one another, at least a portion of the access opening 17 remains unblocked by the net structure 30 to facilitate passage of an operator through the access opening 17 and into the protected area 15. It will be appreciated that engaging the first and second mating portions 50, 52 can facilitate easier passage by an operator through the access opening 17 when the vehicle 10 is not operating. Accordingly, before entering or exiting the protected area 15, an operator might unblock a portion of the access opening 17 by causing contact and resultant engagement between the first and second mating portions 50, 52 (as shown in FIG. 4). However, before operating the vehicle, the operator can disengage the first and second mating portions 50, 52 (as shown in FIG. 1), and can then engage the buckle 56 with the blade 58 to lock the net structure 30 in a closed position.

Figure 8:
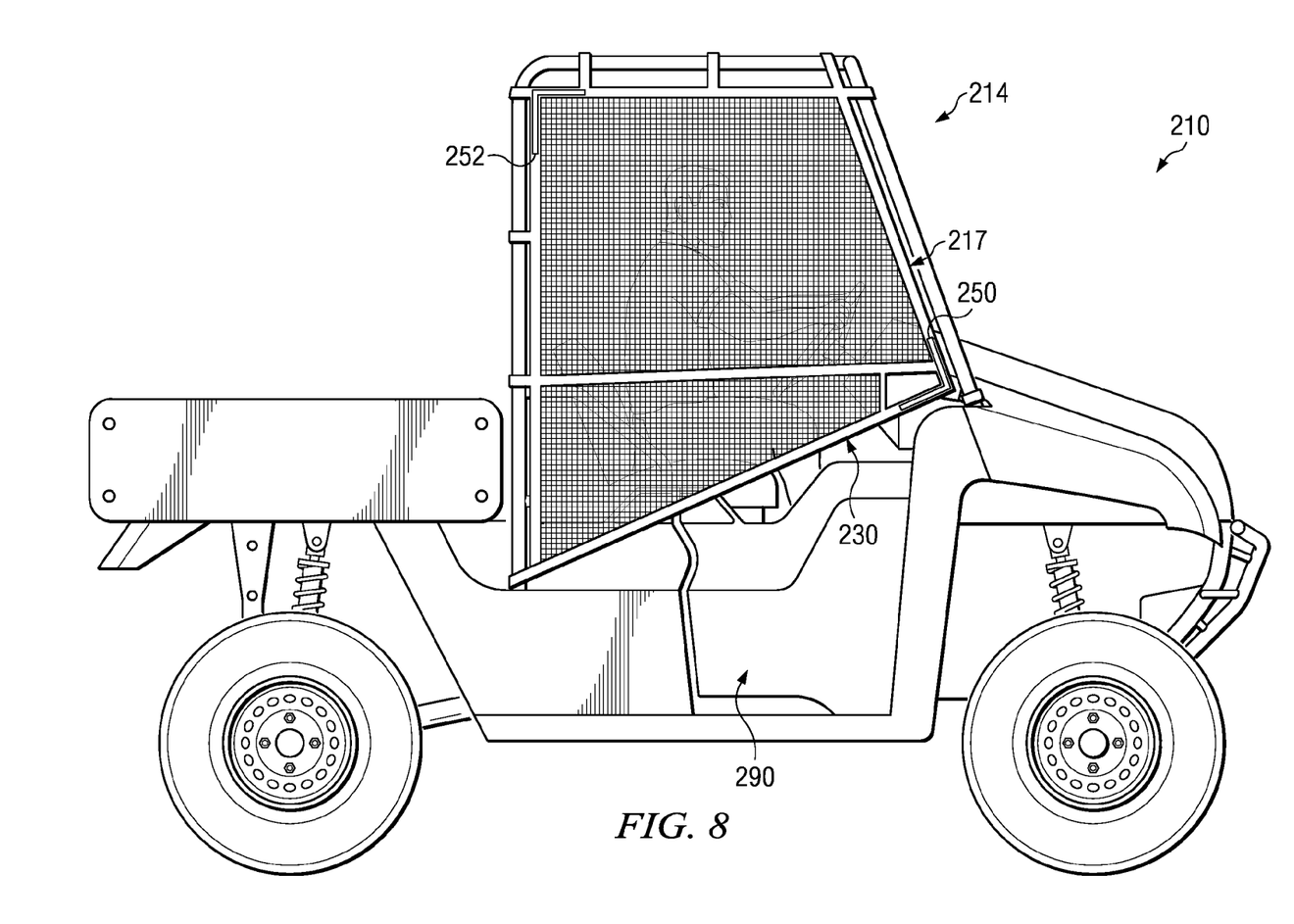
FIG. 8 is a right side elevational view depicting a vehicle having a net structure in accordance with another embodiment.

In an alternative embodiment, as shown in FIG. 8, a vehicle 210 includes a net structure 230 attached to a roll cage 214. The features and operation of the vehicle 210 can be substantially as described above with respect to FIGS. 1-7 except that, in this configuration, it can be seen that a portion of the net structure 230 overlaps a portion of a door 290 when both the door 290 and the net structure 230 are in closed positions, as shown in FIG. 8. When both the net structure 230 and door 290 are in closed positions, the net structure 230 can cooperate with the door 290 to substantially block the access opening 217, and thus prevent the arms and/or legs of an operator, during operation of the vehicle 210, from leaving a protected area defined at least in part by the roll cage 214. It will be appreciated that a net structure (e.g., similar to 230) can provided upon the left side of the vehicle 210 and can selectively partially overlap a door (e.g., similar to 290) provided upon the left side of the vehicle 210. It will also be appreciated that a net structure can partially overlap a door of a vehicle in any of a variety of suitable alternative configurations when the net structure and door are both in closed positions. While this overlap can enhance an ability of a net structure and door to block an access opening of a vehicle, it will be appreciated that a net structure and door can effectively retain an operator within a protected area even if the net structure does not even partially overlap the door when both the net structure and the door are in closed positions.

A net structure can be manufactured from any of a variety of components, and in any of a variety of suitable configurations, and through use of any of a variety of suitable techniques, as described above. One or more such net structures can then be attached to a vehicle in any of a variety of suitable positions and arrangements, and through use of any of a variety of suitable techniques, for protecting one or more operators of the vehicle during various driving conditions of the vehicle. For example, when the vehicle enters a rollover condition, it will be appreciated that a net structure can assist in blocking an operator's arm and/or leg from exiting the vehicle's protected area, thereby helping to prevent injuries to an operator as a result of the vehicle's rollover.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
   a seat configured to support an operator during operation of the vehicle;
   a roll cage at least partially defining a protected area adjacent to the seat, the roll cage additionally at least partially defining an access opening configured to facilitate passage of an operator through the access opening and into the protected area;
   a net structure attached to the roll cage and configured to selectively block at least a portion of the access opening; and a latch assembly comprising first and second interlocking portions which are configured to selectively interlock with one another, wherein the first interlocking portion is attached to the net structure, and wherein the second interlocking portion is attached to the roll cage;

wherein the net structure defines a hand opening adjacent to the first interlocking portion and configured to facilitate passage of a portion of an operator's hand to facilitate grasping of the first interlocking portion; and wherein the roll cage comprises a rearward tubular member, the net structure comprises a fastener arrangement having first and second mating portions, one of the first and second mating portions is provided adjacent to the first interlocking portion, the other of the first and second mating portions is provided adjacent to the rearward tubular member and, when the first and second mating portions are engaged with one another, at least a portion of the access opening remains unblocked by the net structure to facilitate passage of an operator through the access opening and into the protected area.

2. The vehicle of claim 1 wherein the fastener arrangement comprises a hook and loop fastener arrangement, the first mating portion comprises hooks, and the second mating portion comprises loops.

3. A vehicle comprising:
a seat configured to support an operator during operation of the vehicle;
a roll cage at least partially defining a protected area adjacent to the seat, the roll cage additionally at least partially defining an access opening configured to facilitate passage of an operator through the access opening and into the protected area;
a net structure attached to the roll cage and configured to selectively block at least a portion of the access opening; and
a latch assembly comprising first and second interlocking portions which are configured to selectively interlock with one another, wherein the first interlocking portion is attached to the net structure, and wherein the second interlocking portion is attached to the roll cage;
wherein the net structure defines a hand opening adjacent to the first interlocking portion and configured to facilitate passage of a portion of an operator's hand to facilitate grasping of the first interlocking portion;
wherein one of the first and second interlocking portions comprises a buckle of a buckle/blade pair and the other of the first and second interlocking portions comprises a blade of the buckle/blade pair;
wherein the net structure comprises a plurality of strap assemblies, the strap assemblies are wrapped at least partially about respective portions of the roll cage, and, when the buckle engages the blade, the latch assembly cooperates with the strap assemblies to retain the net structure in a closed position in which the net structure blocks at least a portion of the access opening; and
wherein the vehicle further comprises at least one door configured to selectively block a portion of the access opening and, when the net structure is in the closed position and said door is in a closed position, the net structure cooperates with said door to substantially block the access opening.

4. The vehicle of claim 3 wherein, when the net structure is in the closed position and said door is in the closed position, the net structure overlaps at least a portion of said door.

5. A vehicle comprising:
a seat configured to support an operator during operation of the vehicle;
a roll cage at least partially defining a protected area adjacent to the seat, the roll cage additionally at least partially defining an access opening configured to facilitate passage of an operator through the access opening and into the protected area;
a net structure attached to the roll cage and configured to selectively block at least a portion of the access opening; and
a latch assembly comprising first and second interlocking portions which are configured to selectively interlock with one another, wherein the first interlocking portion is attached to the net structure, and wherein the second interlocking portion is attached to the roll cage; wherein
the net structure defines a hand opening adjacent to the first interlocking portion and configured to facilitate passage of a portion of an operator's hand to facilitate grasping of the first interlocking portion; and
the net structure comprises:
a mesh structure comprising a perimeter; and
a flexible reinforcement structure attached to the roll cage and comprising a perimeter strip and a bisecting strip, the perimeter strip being attached to the mesh structure about the perimeter of the mesh structure, the bisecting strip attached to the mesh structure and connecting at opposite ends with spaced portions of the perimeter strip; wherein
the bisecting strip extends generally longitudinally in a direction from a front end of the vehicle to a rear end of the vehicle;
the bisecting strip bisects the mesh structure into an upper portion and a lower portion; and
the first interlocking portion is attached to the reinforcement structure of the net structure.

6. The vehicle of claim 5 wherein the lower portion of the mesh structure has a generally triangular shape.

7. A net structure in combination with an interlocking portion of a latch assembly, the combination comprising:
a net structure configured for attachment to a roll cage of a vehicle; and
an interlocking portion of a latch assembly attached to the net structure and configured to selectively interlock with another interlocking portion attached to a roll cage of a vehicle;
wherein the net structure defines a hand opening adjacent to the interlocking portion, the hand opening is configured to facilitate passage of a portion of an operator's hand to facilitate grasping of the interlocking portion, and the net structure is configured, when attached to a roll cage of a vehicle, to selectively block at least a portion of an access opening to a protected area of a vehicle; and
wherein the net structure comprises a flexible reinforcement structure and a fastener arrangement having first and second mating portions, each of the first and second mating portions being attached to the flexible reinforcement structure, and wherein, when the first and second mating portions are engaged and the net structure is attached to a vehicle, at least a portion of an access opening to a protected area of a vehicle remains unblocked by the net structure to facilitate passage of an operator through the access opening.

8. The combination of claim 7 wherein the interlocking portion attached to the net structure comprises one of a buckle and a blade of a buckle/blade pair.

9. The combination of claim 7 wherein the first and second mating portions respectively comprise hooks and loops, and wherein one of the first and second mating portions is provided adjacent to the interlocking portion.

10. The combination of claim 7 wherein the net structure comprises a plurality of strap assemblies, and wherein the interlocking portion is configured to cooperate with the strap assemblies to facilitate attachment of the net structure to a roll cage of a vehicle.

11. The combination of claim 10 wherein each of the strap assemblies comprises a strap and two D-rings configured to selectively receive the strap.

12. A vehicle comprising:
a seat configured to support an operator during operation of the vehicle;
a roll cage at least partially defining a protected area adjacent to the seat, the roll cage additionally at least partially defining an access opening configured to facilitate passage of an operator through the access opening and into the protected area;
a net structure attached to the roll cage and configured to selectively block at least a portion of the access opening, the net structure defining a hand opening; and
a latch assembly comprising first and second interlocking portions which are configured to selectively interlock with one another; wherein
the first interlocking portion is attached to the net structure adjacent the hand opening and the second interlocking portion is attached to the roll cage;
the hand opening is configured to facilitate passage of a portion of an operator's hand to facilitate grasping of the first interlocking portion;
the net structure comprises a fastener arrangement having first and second mating portions configured to selectively engage one another; and
when the first and second mating portions are engaged with one another, at least a portion of the access opening remains unblocked by the net structure to facilitate passage of an operator through the access opening and into the protected area.

13. The vehicle of claim 12 wherein the fastener arrangement comprises a hook and loop fastener arrangement, the first mating portion comprises hooks, and the second mating portion comprises loops.

14. The vehicle of claim 12 wherein the vehicle further comprises at least one door configured to selectively block a portion of the access opening and, when the net structure is in a closed position and said door is in a closed position, the net structure cooperates with said door to substantially block the access opening.

15. A vehicle comprising:
a seat configured to support an operator during operation of the vehicle;
a roll cage at least partially defining a protected area adjacent to the seat, the roll cage additionally at least partially defining an access opening configured to facilitate passage of an operator through the access opening and into the protected area; and
a net structure attached to the roll cage and configured to selectively block at least a portion of the access opening; and
at least one door configured to selectively block a portion of the access opening; wherein
the net structure comprises a fastener arrangement having first and second mating portions configured to selectively engage one another; and
when the first and second mating portions are engaged with one another, at least a portion of the access opening remains unblocked by the net structure to facilitate passage of an operator through the access opening and into the protected area; and
when the net structure is in a closed position and said door is in a closed position, the net structure cooperates with said door to substantially block the access opening and overlaps at least a portion of said door.

16. A vehicle comprising:
a seat configured to support an operator during operation of the vehicle;
a roll cage at least partially defining a protected area adjacent to the seat, the roll cage additionally at least partially defining an access opening configured to facilitate passage of an operator through the access opening and into the protected area; and
a net structure attached to the roll cage and configured to selectively block at least a portion of the access opening, wherein:
the net structure comprises a fastener arrangement having first and second mating portions configured to selectively engage one another; and
when the first and second mating portions are engaged with one another, at least a portion of the access opening remains unblocked by the net structure to facilitate passage of an operator through the access opening and into the protected area; and
the net structure further comprises:
a mesh structure comprising a perimeter; and
a flexible reinforcement structure attached to the roll cage and comprising a perimeter strip and a bisecting strip, the perimeter strip being attached to the mesh structure about a perimeter of the mesh structure, the bisecting strip attached to the mesh structure and connecting at opposite ends with spaced portions of the perimeter strip; wherein
the bisecting strip extends generally longitudinally in a direction from a front end of the vehicle to a rear end of the vehicle;
the bisecting strip bisects the mesh structure into an upper portion and a lower portion;
the lower portion of the mesh structure has a generally triangular shape; and
the first and second mating portions are attached to the reinforcement structure of the net structure.

* * * * *

UNITED STATES PATENT AND TRADEMARK OFFICE
CERTIFICATE OF CORRECTION

PATENT NO.         : 8,123,279 B2                              Page 1 of 1
APPLICATION NO.    : 12/414728
DATED              : February 28, 2012
INVENTOR(S)        : Bill E. Orr et al.

It is certified that error appears in the above-identified patent and that said Letters Patent is hereby corrected as shown below:

On the title page, items:
(75) Inventors, line 2, change "Kaita Kihoko" to --Kihoko Kaita--;
(75) Inventors, lines 2-3, change "Takahashi Kosaku" to --Kosaku Takahashi--; and
(75) Inventors, line 3, change "Inoue Masahiro" to --Masahiro Inoue--.

Signed and Sealed this
Seventeenth Day of April, 2012

David J. Kappos
*Director of the United States Patent and Trademark Office*